United States Patent [19]

Oguchi et al.

[11] 4,198,600
[45] Apr. 15, 1980

[54] DEMODULATING SYSTEM FOR AUXILIARY CHANNEL IN STRAIGHT-THROUGH RADIO FREQUENCY REPEATER

[75] Inventors: Takuro Oguchi, Kawasaki; Hajime Masuda, Sagamihara, both of Japan

[73] Assignee: Fujitsu Limited, Kawasaki, Japan

[21] Appl. No.: 909,443

[22] Filed: May 25, 1978

[30] Foreign Application Priority Data

May 31, 1977 [JP] Japan .................. 52/63710

[51] Int. Cl.² .......................... H04B 7/14
[52] U.S. Cl. .................. 455/15; 179/170 HF; 455/17; 455/21
[58] Field of Search ........ 325/1, 2, 4, 5, 3, 8, 325/10; 179/170 R, 170 HF, 170 F, 170 C

[56] References Cited

U.S. PATENT DOCUMENTS

| | | | |
|---|---|---|---|
| 3,633,103 | 1/1972 | Sugiyama | 325/10 |
| 3,866,121 | 2/1975 | Nakamura | 325/2 |
| 4,039,947 | 8/1977 | Miedema | 325/3 |
| 4,041,389 | 8/1977 | Oades | 325/3 |
| 4,110,710 | 8/1978 | Watson | 179/170 HF |

OTHER PUBLICATIONS

"2 GHz Repeater Built Without I-F", *Microwaves*, vol. 15, No. 6, p. 16, Jun. 1976.
A 20 GHz Radio Repeater for 400 Mb/s Digital Transmission, Ogata et al., *IEEE Conf. on Comm. Vol II*, Jun. 11-13, 1973, pp. 28-25 to 28-30.

*Primary Examiner*—John C. Martin
*Assistant Examiner*—Michael A. Masinick
*Attorney, Agent, or Firm*—Staas & Halsey

[57] ABSTRACT

The present invention discloses an FM microwave radio frequency repeater using the straight-through system for relaying signals of a plurality of channels having different carrier frequencies, each of the channels including an auxiliary channel. The system according to the invention is characterized in that the auxiliary channel has the signals thereof demodulated through frequency discrimination of a difference frequency signal obtained by mixing together two received microwaves.

16 Claims, 9 Drawing Figures

DEMODULATING SYSTEM FOR AUXILIARY CHANNEL IN STRAIGHT-THROUGH RADIO FREQUENCY REPEATER

BACKGROUND OF THE INVENTION

1. Field of the Invention

The present invention relates to a method for demodulating the signals of auxiliary channels and an FM microwave radio frequency repeater using the straight-through system, with a plurality of channels having different carrier frequencies, each said channel including an auxiliary channel.

2. Description of the Prior Art

With the progress in microwave semiconductor technology, a type of multichannel microwave radio frequency repeater having a simple construction has come into practical use. This repeater is of the type that comprises receiving frequency-modulated radio-frequency signals of the microwave frequency band and transmitting the signals thus received after direct amplification thereof without converting them into intermediate frequencies, or transmitting said received signals after slightly shifting the frequencies thereof for prevention of any interference due to the coupling of the antennas.

In the above-mentioned type of microwave radio frequency repeater, almost all of its transmission characteristics depend upon the characteristics of the amplifier provided therein. At the present time good characteristics are available with such type of microwave radio frequency repeater by virtue of the microwave semiconductors used therein. However, a repeater station equipped with such type of microwave repeater still has a problem with respect to the demodulation of signals for the auxiliary channels. Usually the repeater station is not attended by any operator but is periodically visited by maintenance personnel for inspection. This situation necessitates provision of an auxiliary channel in the microwave repeater, for emergencies, such as trouble with or an accident at the repeater station, for giving an alarm to the terminal station, or allowing various controls from the terminal station to the unattended repeater station or communication from the maintenance personnel to the terminal station for necessary arrangements, etc. Such auxiliary channel can find its effective use in a conventional type, i.e., non-straight-through type, of repeater station since, in such station, received signals can be demodulated by a demodulating circuit after their conversion into intermediate frequencies. However, in the case of a microwave radio frequency repeater using the straight-through system, the repeater is no longer one of a simple construction if equipped with an independent microwave local oscillator for conversion of the picked-up signals into intermediate frequencies. Further, no satisfactory high-sensitive microwave frequency discriminator is currently available, although such a discriminator is necessary for demodulating an auxiliary channel signal through direct FM detection of the microwave. Thus, with today's art the auxiliary channel is difficult to employ in a repeater station equipped with such a microwave repeater using the straight-through system.

SUMMARY OF THE INVENTION

It is an object of the invention to provide a demodulating method for auxiliary channels and an FM microwave radio frequency repeater using the straight-through system, which is capable of easily obtaining demodulated signals for the auxiliary channels without losing the feature of simple construction possessed by such a straight-through microwave radio frequency repeater.

It is a further object of the invention to provide a demodulating method for auxiliary channels and an FM microwave radio frequency repeater using the straight-through system adapted to relay microwaves in both an upline (go) and a downline (return) direction, said method and repeater being capable of easily obtaining demodulated signals for the auxiliary channels.

It is another object of the invention to provide a demodulating method for auxiliary channels and an FM microwave radio frequency repeater using the straight-through system adapted to relay signals of a plurality of channels having different carrier frequencies including auxiliary channels, said method and repeater being capable of easily obtaining demodulated signals for the auxiliary channels.

According to the invention there is provided a demodulating method for auxiliary channels and an FM microwave radio frequency repeater using the straight-through system, characterized in that microwaves of a plurality of microwave channels having different carrier frequencies, each including auxiliary channels, are received, two of the microwaves thus received are mixed to obtain a signal having a frequency of the difference between said two branched frequencies, and said signal having the difference frequency is demodulated to obtain a demodulated signal for said auxiliary channel.

Further features and advantages of the present invention will be apparent from the ensuing description with reference to the accompanying drawings to which, however, the scope of the invention is in no way limited.

DESCRIPTION OF THE PREFERRED EMBODIMENTS

Figure 1:
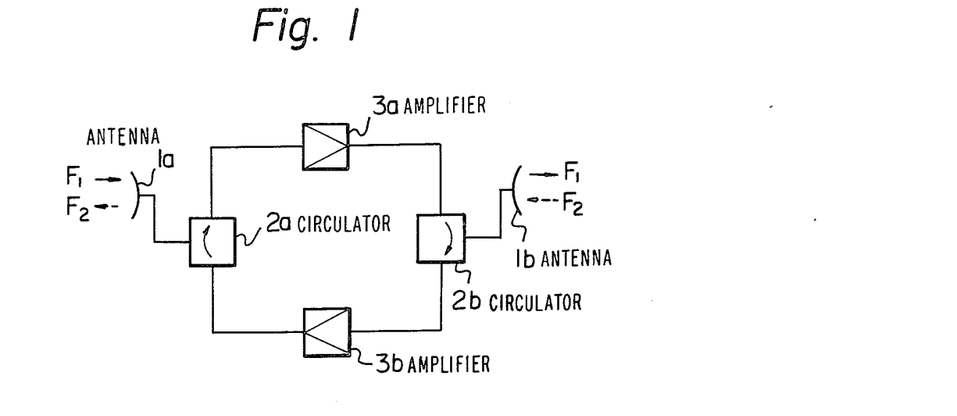
FIG. 1 is a block diagram illustrating the structure of a conventional microwave radio frequency repeater using the straight-through system provided in repeater station.

Referring to FIG. 1, there is illustrated a block diagram for the structure of a conventional repeater in which a frequency-modulated microwave having a frequency $F_1$ (transmitted, e.g. in an upline direction) is received by an antenna 1a, then directed by circulator 2a and amplified by an amplifier 3a. The amplifier 3a, as well as another amplifier 3b, may be provided with a filter means for eliminating spurious radiation and/or with an AGC circuit and a limiting circuit, if required. Then, the signal thus amplified is applied to another circulator 2b to be transmitted through an antenna 1b. A microwave having a frequency $F_2$ (transmitted, e.g. in a downline direction) is received by the antenna 1b, subjected to the circulator 2b, amplified by the amplifier 3b and transmitted by the antenna 1a after passing through the circulator 2a. This conventional type of repeater has almost all of its transmission characteristics dependent upon the characteristics of the amplifiers 3a and 3b, which nowadays are good owing to the use of microwave semiconductors as aforementioned. However, as noted hereinbefore, the repeater station in which the repeater is installed is unattended and is periodically visited by maintenance personnel for inspection. Therefore, an auxiliary channel has to be provided in the repeater for use in an emergency, such as trouble with or an accident at the unattended repeater station, to give an alarm to the terminal station, to allow various controls of the repeater station by the terminal station, or to permit the maintenance personnel to communicate with the terminal station for necessary arrangements, etc.

Figure 2:
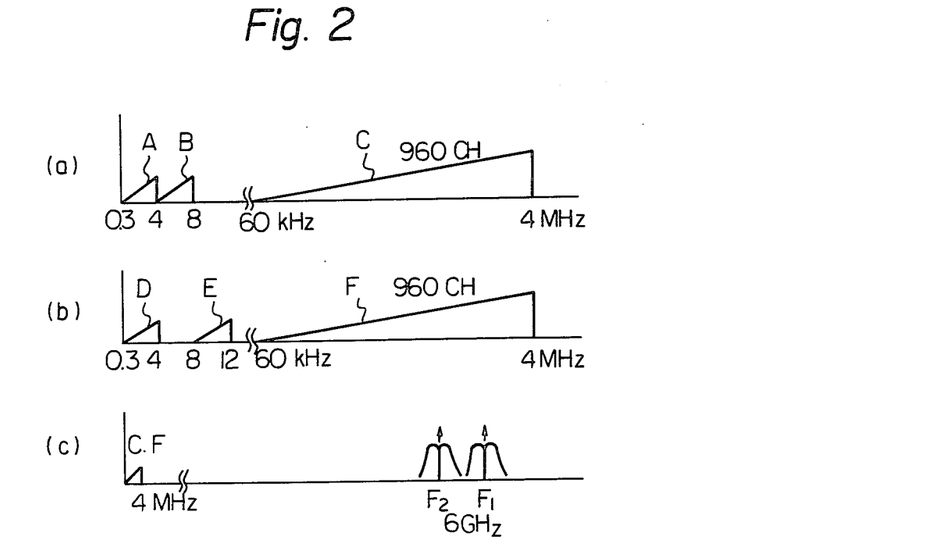
FIG. 2 illustrates a frequency arrangement of the baseband signal and the carrier wave used in the repeater shown in FIG. 1.

Referring now to FIG. 2 illustrating the frequency arrangement, FIG. 2(a) illustrates a frequency arrangement of the baseband signal transmitted in the downline direction. It should be noted that 960 channels of main communication channel signals (designated at C) are arranged in the range of from 60 KHz to 4 MHz, and two channels of signals respectively of from 0.3 to 4 KHz and from 4 to 8 KHz (designated at A and B, respectively) are provided in the lower part of the baseband for the auxiliary channel. Illustrated in FIG. 2(b) are baseband signals transmitted in the upline direction. More specifically, two channels of signals, of respectively from 0.3 to 4 KHz and from 8 to 12 KHz (designated at D and E, respectively), are provided for the auxiliary channel, and main communication channel signals are provided in the range of from 60 KHz to 4 MHz (designated at F). These baseband signals in the upline and the downline directions are subjected to frequency modulation by means of microwave carriers of the 6 GHZ band (Frequencies $F_1$ and $F_2$), separated from each other by 340 MHz, for use as transmitted-received waves for communication between terminal stations via repeater stations. Usually, terminal stations convert the received waves into intermediate frequencies and employ demodulating circuits, so that the auxiliary channel as aforementioned can be effectively utilized. However, in a repeater station employing a straight-through microwave radio frequency repeater, provision of an independent microwave local oscillator in said repeater for conversion of received waves into intermediate frequencies would deprive the repeater of its feature of simplicity in construction. In addition, no satisfactory high-sensitive microwave frequency discriminator has yet been proposed, and such a discriminator would be required for demodulation of auxiliary channel signals through direct FM detection of microwaves.

Figure 3:
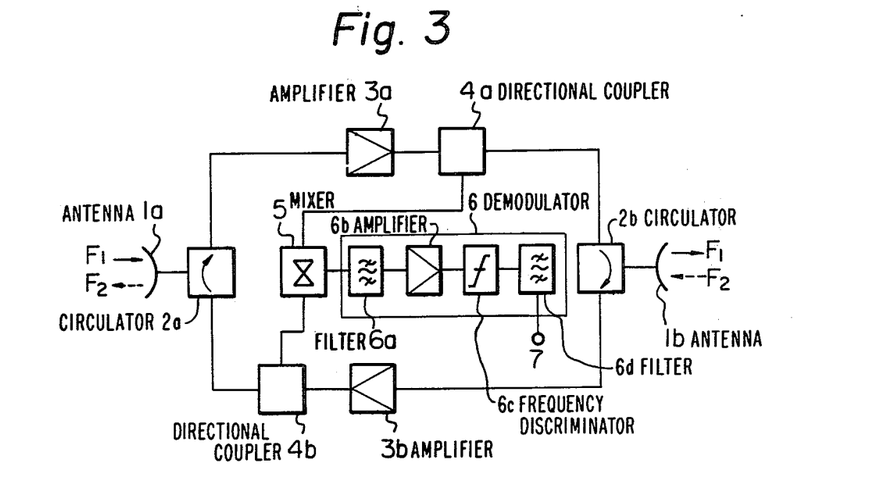
FIG. 3 is a block diagram illustrating the structure of a first embodiment of the present invention.

Referring to FIG. 3, there is illustrated a block diagram illustrating a first embodiment of the present invention, in which: reference numerals 1a, 1b through 3a, 3b represent similar parts to those in FIG. 1; 4a, 4b denote branching directional couplers for extracting part of the signals transmitted through the up and down circuits; 5 represents a mixer for obtaining a difference frequency $F_1 - F_2$ between the signals; 6 designates a demodulator, and; 7 denotes an output terminal for demodulated signals for the auxiliary channel. The demodulator 6 is constituted by a filter 6a for removing unnecessary waves other than components $F_1 - F_2$, an amplifier 6b, a frequency discriminator 6c, and a filter 6d for picking out signals for the auxiliary channel band.

Figure 4:
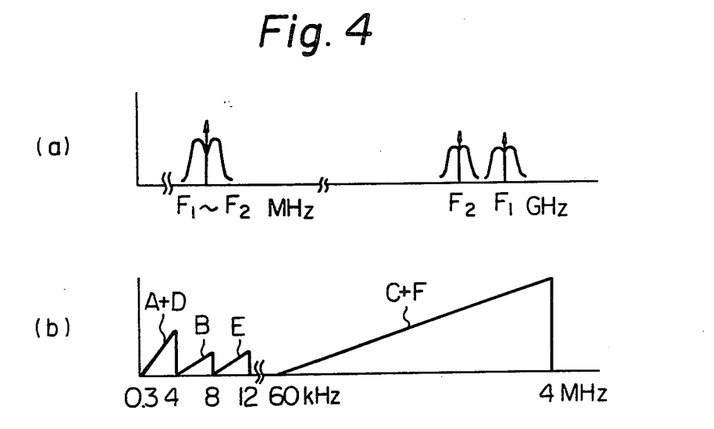
FIG. 4 is a frequency arrangement of a baseband signal and the carrier wave used in the demodulating device of FIG. 3.

Signals having frequencies $F_1$ and $F_2$, extracted by the directional couplers 4a, 4b, are mixed together by the mixer 5 to produce a frequency of the sum of $F_1$ and $F_2$ and a frequency of the difference between $F_1$ and $F_2$, respectively. Of these produced frequencies, the difference frequency $F_1 - F_2$, which corresponds to an intermediate frequency, is picked out by the filter 6a of the demodulator 6, and is then demodulated by the frequency discriminator 6c which can be a conventional type. More specifically, in the frequency arrangement shown in FIG. 4, $F_1$ and $F_2$ are microwave carriers of the 6 GHz band (transmitted-received signals) illustrated in FIG. 2(c). If the difference between $F_1$ and $F_2$ is 340 MHz, the signal $F_1 - F_2$ shown in FIG. 4(a) is a modulated signal with the frequency of 340 MHz as its own carrier. Therefore, the modulated signals can be demodulated by the demodulator 6 into demodulated signals as illustrated in FIG. 4(b). The signals in the range of from 60 KHz to 4 MHz, shown in FIG. 4(b), correspond to the sum of signals C and F of FIGS. 2(a) and (b), and the signals in the range of from 0.3 KHz to 12 KHz correspond to signals A+D, B and E. Since these signals can be obtained separately through frequency separation filters, both of the signals in the upline and downline can be demodulated together at one time. Further, the signal A+D is intended for use in an order wire channel of the so-called omnibus system, which is used when communication need not be carried out between particular repeater stations or between a particular terminal station and a particular repeater station. Also in this system, the order wire signals in both the upline and the downline can be demodulated together.

Still further, since an ordinary telecommunication system is provided with a spare channel intended for temporary use in the event of the occurrence of trouble with the system, even if a channel of either of the upline or the downline becomes out of order, the demodulation operation is not interrupted immediately.

Figure 5:
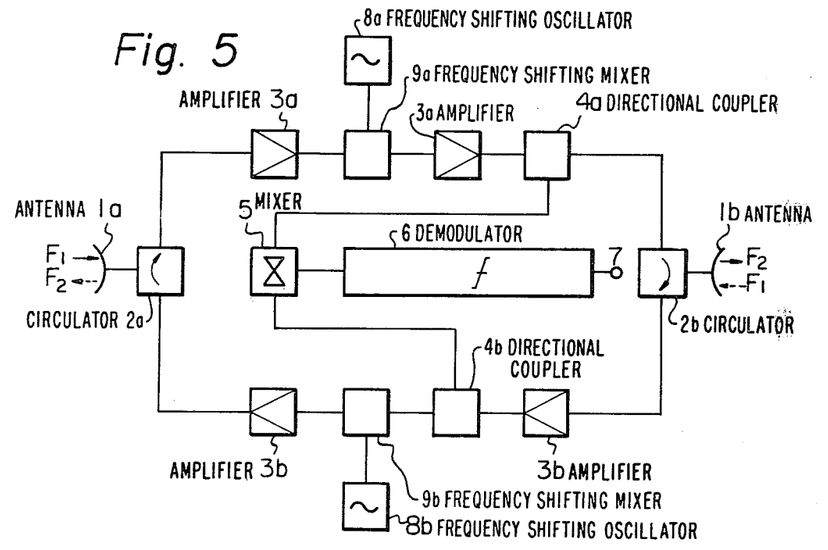
FIG. 5 is a block diagram illustrating the structure of a second embodiment of the present invention.

FIG. 5 is a block diagram illustrating a second embodiment of the invention. In this embodiment, in order to avoid the occurrence of interference due to the coupling of the receiving antenna and the transmitting antenna of the repeater station, the received frequency and the transmitted frequency, both transmitted in the same direction, are shifted so as to have a given difference, e.g., 340 MHz as in the preceding embodiment (two-frequency system). Reference numerals 1a, 1b through 7 denote similar elements or parts to those in FIG. 3. Reference numerals 8a, 8b are frequency shifting oscillators, and 9a, 9b frequency shifting mixers. These mixers may preferably be provided with a band pass filter function for removal of image frequencies. The wave of the frequency $F_1$ received by antenna 1a has its frequency shifted to the frequency $F_2$ by means of the frequency shifting mixer 9a, and said received wave with the shifted frequency $F_2$ is shifted to the mixer 5 after being extracted by the branching directional coupler 4a. The wave of the frequency $F_1$ received by antenna 1b is amplified by the amplifier 3b, extracted by the directional coupler 4b, and then applied to the mixer 5. Thus, a signal $F_1-F_2$ is available at the output terminal of the mixer 5, so that the signal $F_1-F_2$ can be demodulated by the demodulator 6 as in FIG. 2.

Figure 6:
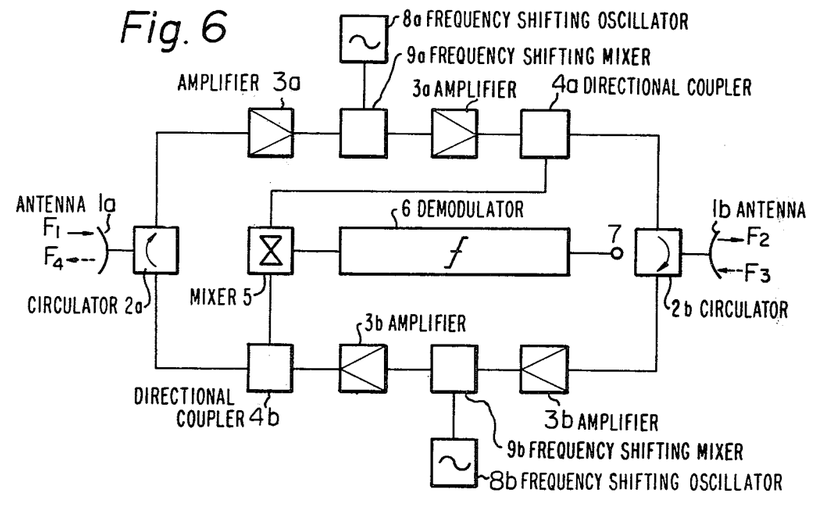
FIG. 6 is a block diagram illustrating the structure of a third embodiment of the present invention.

FIG. 6 is a block diagram illustrating a third embodiment of the invention. In this embodiment, all the received and transmitted waves transmitted in the upline and the downline have different frequencies from one another (four-frequency system). This embodiment can prevent the occurrence of interference due to the coupling of the antennas. In FIG. 6 identical reference numerals to those in FIG. 5 designate identical parts or elements to those in FIG. 5. In FIG. 6, the wave received through the antenna 1a, has its frequency converted into the frequency $F_2$ by means of the frequency shifting mixer 9a. The frequency $F_2$ is then extracted by the branching directional coupler 4a and applied to the mixer 5. The wave with the frequency $F_2$, received through the antenna 1b, has its frequency shifted to frequency $F_4$, then extracted by the branching directional coupler 4b and, then, applied to the mixer 5. Thus, the mixer 5 produces an output signal having a frequency $F_1-F_2$ which can then be demodulated by the demodulator 6. Said branching directional couplers 4a, 4b may be located at the input sides of the respective frequency shifting mixers 9a, 9b, or at both of the input and output sides thereof. That is, branching and mixing may be performed at any place where those frequencies and signal strengths are obtainable which are in conditions wherein they are easy to handle as intermediate frequencies by the demodulators and other devices. Since the characteristic features of the present invention resides in the demodulation of the received waves, the above-description is directed to a case where modulated signals from the terminal stations are demodulated. To effect modulation of signals of the auxiliary channel in such microwave repeater using the straight-through system, the frequency shifting oscillator with a frequency shifting mixer may be provided with a modulating function, if such frequency shifting oscillator is provided in said repeater, or a microwave phase modulator may be used, if such frequency mixer is not provided, to easily obtain modulated signals in either case.

Figure 7:
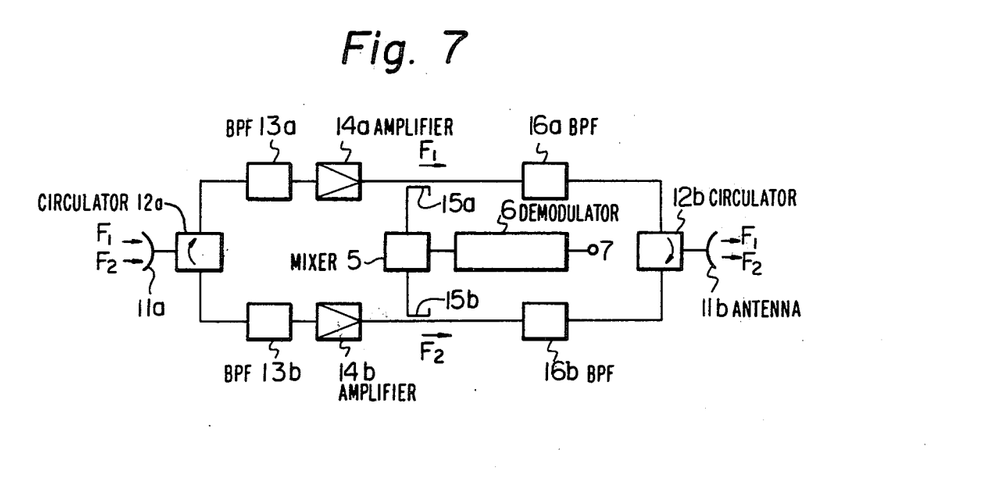
FIG. 7 is a block diagram illustrating the structure of a fourth embodiment of the present invention.

Referring now to a fourth embodiment of the present invention as illustrated in FIG. 7. Multiplexed receiving signals $F_1$, $F_2$, on two routes, which have reached a receiving antenna 11a are applied to a circulator 12a on the input end of the repeater. The circulator 12a delivers said received input signals $F_1$, $F_2$ to a band pass filter 13a. The band pass filter 13a allows only the signal $F_1$ to pass therethrough, while the input impedance of said filter takes a value of zero or infinity with respect to the other signal with a different frequency.

The received signal $F_1$ thus passes through the band pass filter 13a, then is amplified up to a necessary level by an amplifier 14a, followed by being applied to a band pass filter 16a. The band pass filter 16a allows only the signal $F_1$ to pass therethrough, and the signal $F_1$, thus having passed through the filter, is then impressed into a circulator 12b on the output end. The circulator 12b transfers the input signal $F_1$ to a transmitting antenna 11b. Thus, the received signal $F_1$ is amplified and again transmitted under the straight-through system.

On the other hand, the received signal $F_2$ is reflected at the inlet of the band pass filter 13a to be returned to the circulator 12a and passes through the same into another band pass filter 13b. The band pass filter 13b allows only the signal $F_2$ to pass therethrough, so that the signal $F_2$ is applied to the amplifier 14b, which in turn amplifies the same signal up to a necessary level and feeds the amplified signal to the band pass filter 16b.

The band pass filter 16b allows only the signal $F_2$ to pass therethrough. The signal $F_2$, having passed through said filter, is fed to the band pass filter 16a after passing through the branching filter 12b on the output end. The output impedance of the band pass filter 16a takes a value of zero or infinity with respect to frequencies other than that of the signal $F_1$. Accordingly, the signal $F_2$ is reflected by the band pass filter 16a to be returned to the branching circulator 12b. The signal $F_2$ passes through the circulator 12b into the transmitting antenna 11b, through which the signal $F_2$ is radiated for transmision to the next repeater station or to the next terminal station. In this manner, the received signal $F_2$ is amplified and again transmitted under the straight-through system. A part of each of the received signals $F_1$, $F_2$ to be relayed is extracted from their respective transmission lines and applied to the mixer 5 for mixing thereof, and the difference frequency $F_1-F_2$ is produced by the band pass filter of the demodulator 6 and, then, subjected to demodulation through the frequency discriminator.

Figure 8:
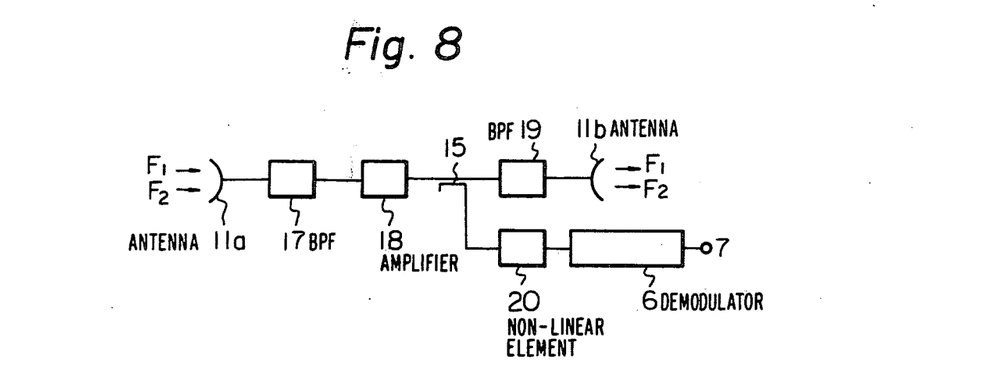
FIG. 8 is a block diagram illustrating the structure of a fifth embodiment of the present invention.

Illustrated in FIG. 8 is a fifth embodiment according to the invention. In this embodiment, multiplexed signals $F_1$, $F_2$, transmitted on two routes and received by the receiving antenna 11a, are applied to a band pass filter 17, which allows both of the signals $F_1$, $F_2$ to pass therethrough, and then, be amplified together by an amplifier 18 up to a necessary strength. They are further applied to a band pass filter 19, which permits both of them to pass therethrough, and then, they are transmitted via a transmitting antenna 11b to the next repeater station or to the next terminal station. Thus, the signals $F_1$, $F_2$ are relayed in a straight-through manner.

In such straight-through repeater, if the received signals $F_1$, $F_2$ being relayed are taken out of their common transmission line and applied to a non-linear element 20, such as a diode, a signal having a frequency of the sum of $F_1+F_2$ and a signal having a frequency of the difference between $F_1$ and $F_2$ are produced. Out of these produced signals, the signal having the difference frequency of $F_1-F_2$ is extracted for demodulation by means of the frequency discriminator in the demodulator 6.

The signal having the difference frequency of $F_1-F_2$ contains frequency-modulated components possessed by the original signals $F_1$, $F_2$ and said components are available at the output terminal of the demodulator 6, so that they can be used as signals for the auxiliary channels on the two routes in a similar manner to that of the embodiment of FIG. 7.

In the embodiments of FIG. 7 and FIG. 8, it should be noted that the received signals are directly amplified for the relaying thereof. However, the demodulating method for the auxiliary channel according to the invention can, of course, include shifting the frequencies of the received signals into different frequencies for the relaying thereof. Also, in the case of a straight-through repeater having three or more routes, if the received signal on each route is subjected to amplification as in the embodiment of FIG. 7, first the sum of signals $F_1$, $F_2$ on two of the routes, or the difference $F_1-F_2$, is produced, and then, the sum of said sum $F_1+F_2$ and the signal $F_3$ on a third route or the difference therebetween is produced, and then, demodulated. Thus, the signals $F_1$, $F_2$, $F_3$ can be utilized as signals for the auxiliary channels of the three routes. A similar process to this can be applied in the case of using a four or more route straight-through repeater.

Figure 9:
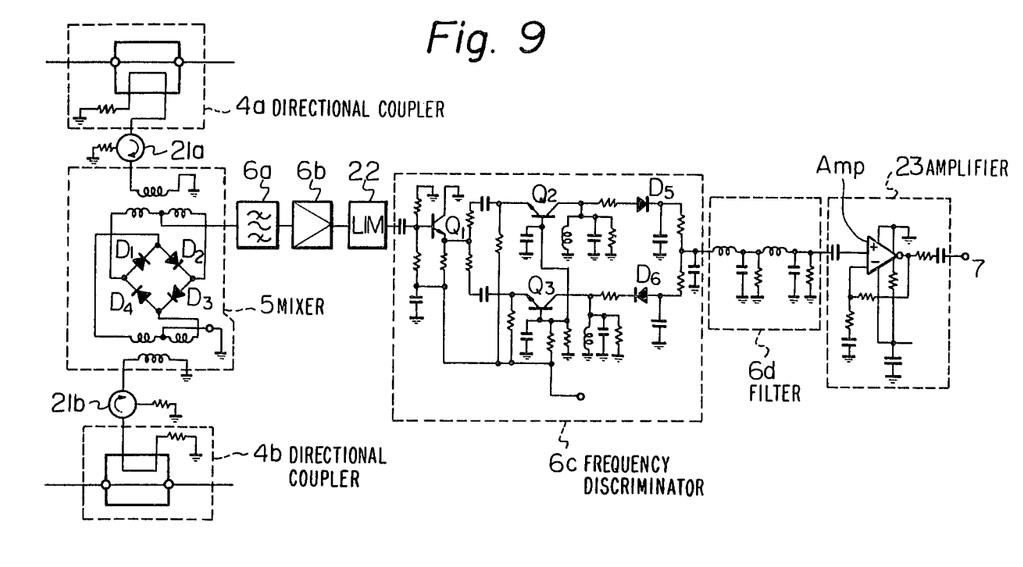
FIG. 9 is one example of the circuit diagram of the mixer and the demodulator used in the device according to the present invention.

FIG. 9 illustrates in detail the circuits of the mixer 5 and the demodulator 6 used in the embodiments of the invention illustrated in FIG. 3, FIG. 5, FIG. 6 and FIG. 7. In FIG. 9, the directional couplers 4a, 4b can usually be coaxial directional couplers, such as Model 3004 manufactured by Narda Microwave Corporation. Isolators 21a, 21b are employed in connection with the directional couplers 4a, 4b, respectively, for prevention of cross talk between the signal frequencies $F_1$, $F_2$. A suitable isolator which can satisfy this purpose is, for instance, M3E-7200 manufactured by Microwave Associates, but the isolators 21a, 21b can be omitted if desired. The mixer 5 can be a Doubly Balanced Mixer incorporating four diodes as illustrated in FIG. 9. A suitable model for the band pass filter 6a can be Model TBP-340-50-3, of Telonic Industries Inc. A suitable model type for the wide band amplifier 6b can be Model G.P.D.-401 or G.P.D.-403, of Avantec Inc. Model PLS-1 of Mini-Circuits Laboratory is suitable for use as the limiter 22. The frequency discriminator 6c, as illustrated, is constituted by a double-tuned discriminator incorporating transistors $Q_1$, $Q_2$, $Q_3$ and diodes $D_5$, $D_6$. The band pass filter 6d is a low frequency band pass filter constituted by inductance and capacitance elements, the output of which is amplified by a low frequency amplifier 23 and supplied to the terminal 7.

As described in the foregoing, according to the method of the present invention, no microwave oscillator is necessary for demodulating signals for the auxiliary channel. Further, the demodulator does not require a microwave frequency discriminator, but need only include just one intermediate frequency discriminator, thus being very simple in construction.

What is claimed is:

1. A demodulating method for auxiliary channel signals in a straight-through radio frequency repeater which relays microwave signals frequency-modulated by baseband signals composed of main communication channel signals and auxiliary channel signals having a different frequency band from that of said main communication channel signals, comprising:
   receiving a plurality of said microwave signals having different carrier frequencies;
   branching two of said plurality of microwave signals thus received;
   producing a difference frequency signal between said two branched microwave signals; and demodulating said difference frequency signal to regenerate said auxiliary channel signals.

2. The method as claimed in claim 1, wherein said plurality of microwave signals having different carrier frequencies consist of both microwave signals transmitted in an upline and microwave signals transmitted in a downline.

3. The method as claimed in claim 1, wherein said plurality of microwave signals having different carrier frequencies consist of microwave signals all transmitted in the same direction.

4. A straight-through radio frequency repeater for relaying microwave signals, said microwave signals being frequency-modulated by baseband signals composed of main communication channel signals and auxiliary channel signals having a different frequency band from that of said main communication channel signals, comprising:
   a first receiving means for receiving upline microwave signals;
   a first microwave amplifier, operatively connected to said first receiving means, for amplifying said received upline microwave signals;
   a first branching directional coupler operatively connected to said first microwave amplifier for extracting part of said received upline microwave signals;
   a second receiving means for receiving downline microwave signals;
   a second microwave amplifier, operatively connected to said second receiving means, for amplifying said received downline microwave signals;
   a second branching directional coupler, operatively connected to said second microwave amplifier, for extracting part of said received downline microwave signals;
   a frequency mixer, operatively connected to said first and second branching couplers, for producing a difference frequency signal, said difference frequency signal being the difference between said received upline and downline microwave signals, and
   a demodulator, operatively connected to said frequency mixer, for demodulating said difference frequency signal,
   whereby said auxiliary channel signals are regenerated.

5. The straight-through radio frequency repeater as claimed in claim 4, wherein said demodulator comprises:
   a first filter for removing unnecessary signals other than said difference frequency signal;
   an amplifier operatively connected to said first filter for amplifying said difference frequency signal;
   a frequency discriminator operatively connected to said amplifier for extracting said auxiliary channel signal from said difference frequency signal, and
   a second filter, operatively connected to said frequency discriminator, for passing signals in the frequency band of said auxiliary channel signals.

6. The straight-through radio frequency repeater as claimed in claim 4, which further comprises:
   a first frequency shifting oscillator;
   a first frequency shifting mixer, operatively connected to said first microwave amplifier and said first frequency shifting oscillator, for mixing the outputs of said first frequency shifting oscillator and said first microwave amplifier to shift the frequency of said upline received microwave signal;
   a third microwave amplifier, operatively connected to said first frequency shifting mixer, for amplifying the output from said first frequency shifting mixer;
   a second frequency shifting oscillator;
   a second frequency shifting mixer, operatively connected to said second microwave amplifier and said second frequency shifting oscillator, for mixing the outputs of said second frequency shifting oscillator and said second microwave amplifier to shift the frequency of said downline received microwave signal, and
   a fourth microwave amplifier operatively connected to said second frequency shifting mixer for amplifying an output from said second frequency shifting mixer.

7. The straight-through radio frequency repeater as claimed in claim 6, wherein said first frequency shifting mixer shifts the frequency of a received microwave signal having a frequency $F_1$ into a microwave signal having a frequency $F_2$, and said second frequency shifting mixer shifts the frequency of a received microwave signal having a frequency $F_2$ into a microwave signal having a frequency $F_1$.

8. The straight-through radio frequency repeater as claimed in claim 6, wherein said first frequency shifting mixer shifts the frequency of a received microwave signal having a frequency $F_1$ into a microwave signal having a frequency $F_2$, and said second frequency shifting mixer shifts the frequency of a received microwave signal having a frequency $F_3$ into a microwave signal having a frequency $F_4$.

9. The straight-through radio frequency repeater as claimed in claim 6, wherein modulation of said auxiliary channel signals is effected by modulating the outputs from said first and second frequency shifting oscillators.

10. A straight-through radio frequency repeater for relaying multiplexed microwave signals, said multiplexed microwave signals being frequency-modulated by baseband signals composed of main communication channel signals and auxiliary channel signals having a different frequency band from that of said main communication channel signals, comprising:
a receiving means for receiving said multiplexed microwave signals;
a first microwave amplifier, operatively connected to said receiving means, for amplifying a first of said multiplexed microwave signals;
a first branching directional coupler, operatively connected to said first microwave amplifier, for extracting part of the output from said first microwave amplifier;
a second microwave amplifier, operatively connected to said receiving means, for amplifying a second of said multiplexed microwave signals;
a second branching directional coupler operatively connected to said second microwave amplifier for extracting part of the output from said second microwave amplifier;
a frequency mixer operatively connected to said first and second branching couplers for producing a difference frequency signal, said difference frequency signal being the difference between said first and second microwave signals, and
a demodulator connected to said frequency mixer for demodulating said difference frequency signal whereby said auxiliary channel signals are regenerated.

11. A straight-through radio frequency repeater for relaying multiplexed microwave signals, said multiplexed microwave signals being frequency-modulated by baseband signals composed of main communication channel signals and auxiliary channel signals having a different frequency band from that of said main communication channel signals, comprising:
a receiving means for receiving said multiplexed microwave signals;
a microwave amplifer, operatively connected to said receiving means, for amplifying a first and a second of said multiplexed microwave signals;
a transmitting means, operatively connected to said microwave amplifier, for transmitting an output of said microwave amplifier;
an extracting means, operatively connected to said transmitting means, for extracting part of said transmitted output of said microwave amplifier;
a signal producing means, operatively connected to said extracting means, for producing a difference frequency signal said difference frequency signal being the difference between said first and second microwave signals; and
a demodulator connected to said signal producing means for demodulating said difference frequency signal,
whereby said auxiliary channel signals are regenerated.

12. A straight-through radio frequency repeater as claimed in claim 11, wherein said signal producing means is a non-linear element.

13. A straight-through radio frequency repeater as claimed in claim 12, wherein said non-linear element is a diode.

14. A straight-through radio frequency repeater as claimed in claim 11, wherein said demodulator comprises:
a first bandpass filter for filtering out frequencies other then said difference frequency signal;
a wideband amplifier, operatively connected to said first bandpass filter, for amplifying said difference signal;
a double tuned frequency discriminator, operatively connected to said wideband amplifier, for selecting signals in the frequency band of said auxiliary channel signals.

15. A straight-through radio frequency repeater as claimed in claims 4, 6 or 10, wherein said demodulator comprises:
a first bandpass filter for filtering out frequencies other than the frequency of said difference frequency signal;
a wideband amplifier, operatively connected to said first bandpass filter, for amplifying said difference signal;
a double tuned frequency discriminator, operatively connected to said wideband amplifier, for selecting signals in the frequency band of said auxiliary channel signals.

16. A straight-through radio frequency repeater as claimed in claim 15, wherein each said branching directional coupler is a coaxial directional coupler.

* * * * *

UNITED STATES PATENT AND TRADEMARK OFFICE
CERTIFICATE OF CORRECTION

PATENT NO. : 4,198,600
DATED : April 15, 1980
INVENTOR(S) : TAKURO OGUCHI et al

It is certified that error appears in the above—identified patent and that said Letters Patent are hereby corrected as shown below:

Column 4, line 1, there is a space before "denote" which should not be there.

Column 6, line 18, change "transmision" to --transmission--.

Signed and Sealed this

Fifth Day of August 1980

[SEAL]

Attest:

SIDNEY A. DIAMOND

Attesting Officer

Commissioner of Patents and Trademarks